United States Patent [19]

Ito et al.

[11] Patent Number: 5,549,039
[45] Date of Patent: Aug. 27, 1996

[54] HEAT-INSULATING COOKING CONTAINER

[75] Inventors: Seiichi Ito; Toru Goto; Kazuhiro Kawamura; Hiroyuki Tomuro, all of Tokyo, Japan

[73] Assignee: Nippon Sanso Corporation, Tokyo, Japan

[21] Appl. No.: 549,573

[22] Filed: Oct. 27, 1995

[30]    Foreign Application Priority Data

Dec. 2, 1994   [JP]   Japan .................. 6-299989
Dec. 2, 1994   [JP]   Japan .................. 6-299990

[51] Int. Cl.⁶ .............. A47J 27/00; A47J 36/00; A45C 11/20; B65D 81/38
[52] U.S. Cl. .............. 99/340; 99/403; 220/408; 220/420; 220/425; 220/739; 220/903; 220/912
[58] Field of Search .............. 9/337, 339, 340, 9/357, 403, 410–418, 467; 126/369, 373, 375–377, 390; 206/541, 544–546, 549; 220/400, 408, 411–413, 420–426, 375, 428, 739, 431, 902, 532, 903, 737

[56]    References Cited

U.S. PATENT DOCUMENTS

| 472,002 | 3/1892 | Ross et al. .................. 99/340 |
| 1,331,530 | 2/1920 | Shaw .................. 99/403 |
| 1,625,999 | 4/1927 | Irish .................. 99/403 |
| 1,998,920 | 4/1935 | Bremer .................. 99/340 |
| 3,355,045 | 11/1967 | Douglas .................. 220/425 |
| 3,670,918 | 6/1972 | Mitchell .................. 206/545 |
| 3,876,104 | 4/1975 | Minsky et al. . |
| 4,213,310 | 7/1980 | Buss . |
| 4,675,508 | 6/1987 | Miyaji et al. .................. 220/420 |
| 4,721,216 | 1/1988 | Kinder .................. 220/903 |
| 4,921,120 | 5/1990 | Mizioch .................. 220/739 |
| 5,031,519 | 7/1991 | Toida et al. .................. 99/340 |
| 5,251,542 | 10/1993 | Itoh et al. .................. 99/403 |
| 5,335,809 | 8/1994 | Toida et al. .................. 220/375 |
| 5,355,777 | 10/1994 | Chen et al. .................. 99/340 |

FOREIGN PATENT DOCUMENTS

| 0392940 | 10/1990 | European Pat. Off. . |
| 0406750 | 1/1991 | European Pat. Off. . |
| 0543750 | 5/1993 | European Pat. Off. . |
| 2249638 | 5/1975 | France . |
| 2658162 | 8/1991 | France . |
| 2151128 | 7/1985 | United Kingdom . |

*Primary Examiner*—Timothy F. Simone
*Attorney, Agent, or Firm*—Darby & Darby P.C.

[57]    ABSTRACT

The present invention relates to a heat-insulating (adiabatic) cooking container which is ideal for use in cooking, wherein partially-cooked food or the like is thermally insulated with the finished cuisine being prepared thereafter, and, in particular, in which the opening-closing operation of the lid is easily accomplished. The heat-insulating cooking container of the present invention comprises a connecting portion connecting an outer container and a lid member which is equipped with a hinge axis axially supporting the lid member such that this lid member can be opened and closed with respect to the outer container, and a biasing member for biasing the lid member in an opening direction; and a stopping member for maintaining a state in which the lid member is closed.

27 Claims, 7 Drawing Sheets

HEAT-INSULATING COOKING CONTAINER

BACKGROUND OF THE INVENTION

1. Field of the Invention

The present invention relates to a heat-insulating (adiabatic) cooking container which is ideal for use in cooking, wherein partially-cooked food or the like is thermally insulated with the finished cuisine being prepared thereafter, and, in particular, in which the opening-closing operation of the lid is easily accomplished.

2. Relevant Art

In general, heat cooking methods for cooking food are conducted using electric heating, direct heating, or the like. However, according to such cooking methods, problems exist in that breakdown of the food, as well as scorching and sticking are easily generated by excessive heat, while a large amount of heat energy is also consumed in the aforementioned process. As a cooking method capable of solving the aforementioned problems, a cooking method is known in which a finished cuisine is prepared by means of dipping the desired raw vegetables, grains, cereals, or the like, into boiling water or stock which has been brought to a boil, and then thermally insulating the partially-prepared food in its heated state for a long period of time.

Figure 13:
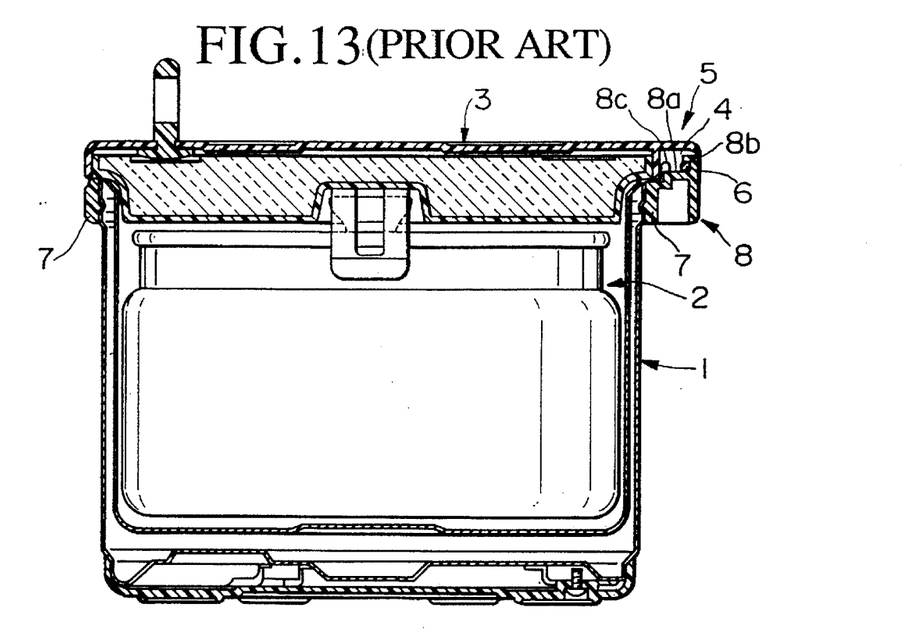
FIG. 13 is a cross-sectional diagram showing an example of a conventional heat-insulating cooking container.
Figure 14:
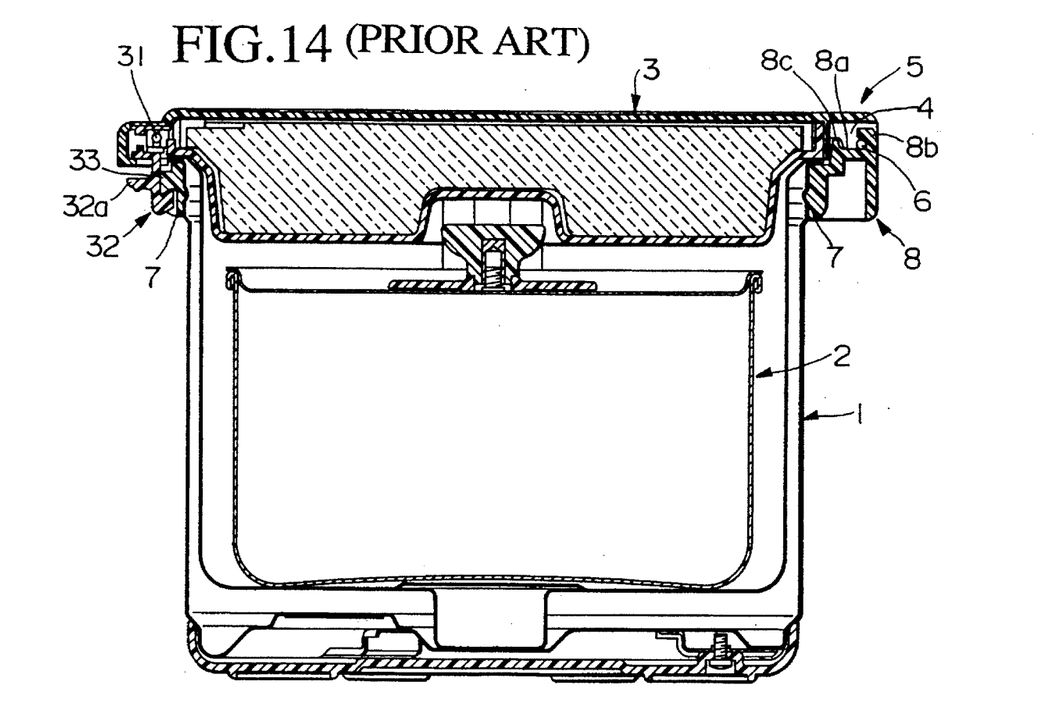
FIG. 14 is a cross-sectional diagram showing another example of a conventional heat-insulating cooking container.

A known heat-insulating cooking container which is ideal for use in this cooking method is shown in FIGS. 13 and 14.

The heat-insulating cooking container shown in FIG. 13 comprises an outer container 1 possessing heat-insulating properties, inner container 2, and lid member 3 possessing heat insulating properties for closing the mouth opening of the aforementioned outer container 1. Outer container 1 comprises a double-walled structure formed from an outer bottle and an inner bottle in a manner such that a vacuum insulating layer is formed between these inner and outer bottles.

On the peripheral portion of the aforementioned lid member 3, a convex member 5 is provided which protrudes toward the exterior and comprises rib walls 4 and 4 on each side therein. A hinge axis 6 is installed horizontally in between these rib walls 4 and 4.

In addition, a ring-shaped shoulder member 7 is installed on a peripheral mouth portion of outer container 1. A hinge-receiving member 8 engaging with the aforementioned hinge axis 6 and connecting in a rotatable manner to the aforementioned lid 3 is integrally formed in shoulder member 7. This hinge-receiving member 8 comprises upper face 8a possessing dimensions fitting in between rib walls 4 and 4 of the aforementioned lid 3. A tongue-sheet 8b is provided protruding directly upward from the outer edge of upper face 8a with the upper edge thereof curving inwards. This tongue-sheet 8b forms a translot which serves to stop hinge axis 6 installed in lid member 3. In addition, a stopper 8c is provided on the inner edge of upper face 8a for preventing separation of hinge axis 6 stopped (maintained) by means of the aforementioned translot from outer container 1. According to this conventional heat-insulating cooking container, a connecting portion connecting the lid member to the outer container is formed by means of engaging hinge-receiving member 8 of outer container 1 and hinge axis 6 of lid member 3.

Furthermore, in the heat-insulating cooking container shown in FIG. 14, in addition to the components provided in the heat-insulating cooking container of FIG. 13, a hook 32 is provided at the periphery of lid member 3 on the side opposite the aforementioned connecting portion. In addition, a locking mechanism is arranged facing this hook 32 which is formed by means of providing hook stopper 33 at the periphery of shoulder member 7.

The tip of the aforementioned hook 32 forms a fishhook-like shape curving inwards at an acute angle; on the outer surface of hook 32, grip 32a is provided for opening and closing hook 32. This hook 32 is also installed in a manner such that the base therein can be rotated using hinge 31 as the fulcrum.

In addition, hook stopper 33 which is formed on the outer container 1 side is constructed in a manner so as to engage with the curved portion of the fishhook-shaped tip of hook 32.

However, in the aforementioned conventional insulating cooking containers, only a structure in which hinge axis 6 of lid member 3 is maintained (stopped) in hinge-receiving member 8 of outer container 1 by means of a hinge portion is realized: thus, hinge axis 6 is able to move freely over upper face 8a of hinge-receiving member 8 between tongue-sheet 8b and stopper 8c, thereby generating rattling in the connecting portion.

In addition, in order to increase the heat-insulating properties of the container, lid member 3 forms a structure which depresses into the interior of outer container 1 as shown in FIGS. 13 and 14. However, due to the necessity of preventing convection from generating at the inner mouth base of outer container 1, when closing lid 3, it is not possible to provide a large space between the inner circumferential surface of outer container 1 and the peripheral surface of lid member 3 facing the aforementioned.

In this manner, when hinge axis 6 is displaced from a fixed position at which it is maintained, at the time of opening/closing lid member 3, this lid member 3 comes into contact with inner container 2 or outer container 1, and hence smooth opening/closing operations are not possible.

In addition, according to the heat-insulating cooking container in which a locking mechanism is provided as shown in FIG. 14, when locking lid member 3, the curved fishhook portion of hook 32 pushes into hook stopper 33; while when releasing this locking, grip 32a provided in hook 32 is lifted upwards toward the exterior, thereby separating hook 32 from hook stopper 33. Furthermore, when opening lid member 3, since the locking must be released before lifting lid member 3, it is necessary to conduct a two-stage operation. Consequently, this type of locking mechanism poses some troublesome operations.

Moreover, with regard to this type of locking mechanism, in order to reduce the leakage of heat from the space between lid member 3 and outer container 1 as much as possible, it is undesirable to provide excessive slack within the arrangement of hook 32 and hook stopper 33. As a result, when eccentricity or distortion is generated in the mouth portion of outer container 1, the locking of hook 32 and hook stopper 33 cannot always be reliably conducted, thereby leading to fears of insufficient heat-insulating properties in the resultant container.

SUMMARY OF THE INVENTION

In consideration of the aforementioned, it is an object of the present invention to provide a heat-insulating cooking container in which the opening/closing operation of the lid can be easily and smoothly performed, and wherein the locking of the lid and outer container can be reliably performed even when eccentricity or deformation is generated in the mouth portion of the outer container.

The heat-insulating cooking container of the present invention comprises a connecting portion connecting an outer container and a lid member which is equipped with a hinge axis axially supporting the lid member such that this lid member can be opened and closed with respect to the outer container, and a biasing member for biasing the lid member in an opening direction: and a stopping member for maintaining a state in which the lid member is closed.

According to a preferred aspect of the present invention, a heat-insulating cooking container is provided comprising a ring-shaped shoulder member provided at a peripheral mouth portion of said outer container and comprising a hinge member equipped with a hinge axis and biasing member, which is provided with one end thereof projecting radially inward; and hook stopping member; wherein said hook stopping member engages said lid member with said hinge axis of said hinge member; engages said lid member in a state in which said lid member is biased in an opening direction by means of one end of said biasing member; and engages a hook at a peripheral position facing said hook of said lid member.

In addition, according to another preferred aspect of the present invention, a heat-insulating cooking container is provided comprising a hinge member comprising a hinge axis, hinge member main body provided in a rotatable manner in said hinge axis and biasing member provided with one end thereof projecting radially inward, said hinge member provided at the periphery of said lid member in a state in which said lid member is biased in an opening direction by means of one end of said biasing member, said hinge member comprising a hinge axis: hook stopping member provided at a peripheral side of said lid member opposite said hinge member; and ring-shaped shoulder member provided at a peripheral mouth portion of said outer container and comprising a hinge-receiving member into which said hinge member of said lid member can be removably installed, and a hook provided at a peripheral side of said lid member opposite said hinge-receiving member.

According to this aforementioned aspect, it is also possible to provide a stop-click provided in said hinge-receiving member; projecting sheet member provided in said hinge member which can be forcibly bent in a radially inward direction and restored to an opposite side therein; and stop projecting member provided in said projecting sheet member for engaging said stop-click. Furthermore, it is possible to place another end of said biasing member arranged in said hinge member in contact with an interior wall surface of said projecting sheet member.

In addition, it is also possible to provide a stop projecting member formed in a protruding end of said hinge member main body for engaging a lower end of said hinge-receiving member.

In the heat-insulating cooking container according to the present invention, it is also possible to employ as the aforementioned outer container a vacuum insulating container or an insulating container filled with a heat-insulating material.

In addition, it is possible to arrange a structure in which said hook is axially maintained in a vertically rotatable manner at a peripheral mouth portion of said outer container, and biased towards a position for locking said lid member in a closed state.

It is preferable to provide an engaging member of at least 3 mm in said hook stopping member.

It is possible to select said biasing member of said connecting member from the group consisting of a coil spring, torsion spring, and plate spring. Preferably, said biasing member is a torsion spring which is axially maintained by means of said hinge axis which is provided in a hinge member, in a state in which said lid member is biased in an opening direction wherein one arm of said torsion spring is inserted into said lid member and another arm of said torsion spring is arranged facing downward in an interior of said hinge member.

It is preferable to provide said hinge axis at a position above an upper end of said outer container.

The heat-insulating cooking container of the present invention comprises a connecting portion connecting an outer container and a lid member which is equipped with a hinge axis axially supporting the lid member in a rotatable manner such that this lid member can be opened and closed, and a biasing member for biasing the lid member in an opening direction. Therefore, normally, since the lid member is biased in a fixed direction, it is possible to reduce the amount of rattling generated in the aforementioned connecting portion connecting the outer container and lid member, and also smoothly conduct the opening/closing of the lid member. Consequently, this type of container is easy to use and offers superior handling.

Furthermore, by providing a hook on the side opposite the aforementioned connecting portion of the peripheral mouth portion of the outer container, and by providing a hook stopping member at the periphery of the lid member facing said hook, by simply releasing the latching of the hook and hook stopping member, it is possible to automatically raise the lid member by means of the restoring force of the biasing member arranged in the hinge member. In this manner, the lid of the container can be easily opened.

In addition, by axially supporting a hook at a peripheral mouth portion of the outer container in a rotatable manner by means of said hinge axis, and by biasing this hook to a position for stopping the lid member, it is possible to release the stopping (latching) of the hook and hook stopper by simply pressing and rotating said hook. In this manner, the lid of the container can be easily opened.

In order to close the lid member, the lid member is placed over the mouth opening of the outer container and simply pressed downward. By means of this action, the side face of the hook stopper of the lid member slides (displaces) the hook click of the hook which is biased to a stopping position, and the hook is rotated. Furthermore, by pushing the lid member downward and sealing the mouth opening of the outer container, the contact of the aforementioned side face of the hook stopper and the hook click is released and the hook is restored to a stopping position. Accordingly, it is possible to close the lid member, and lock the lid member and outer container. Consequently, the complicated actions of opening/closing the lid member are solved.

Additionally, the lid member can be reliably closed and locked regardless of which part of the hook stopper stops the aforementioned hook. In this manner, it is possible to apply an additional margin with regard to the measurement of the hook stopper; in particular, by providing an engaging member of at least 3 mm in the radial direction of the stopper top panel of said hook stopper, even in when the opening of the outer container is eccentric or deformed, it is possible to reliably stop the hook click by means of the aforementioned stopper top panel, thereby further improving the heat-insulating properties of the container.

Furthermore, by providing a hinge member on the periphery of the lid member and a hinge-receiving member on a peripheral mouth portion of the outer container, due to the detachable nature of these components, the lid member and/or outer container can be easily washed and an excellent handling (operational properties) is obtained.

By providing a stop-click in the hinge-receiving member and a projecting sheet which can be forcibly bent a radially inward direction in the hinge member main body, and by realizing a structure in which a stop projecting member engages with the above projecting sheet and stop-click, it is possible to easily detach the lid member from the outer container.

In addition, by arranging a biasing member provided in the hinge axis of said hinge member in a manner such that one end thereof contacts the inner wall surface of the aforementioned projecting sheet, when the lid member is closed, by biasing this projecting sheet radially outwards using said biasing member, separation of the stop projecting member formed in said projecting sheet from the stop-click formed in said hinge-receiving member is prevented, and the connection between the outer container and lid member is reliably assured. Furthermore, when the lid member is opened, the biasing member is extended thereby reducing the force biasing the projecting plate in the radially outward direction. As a result, it is possible to easily bend the projecting member in a radially inward direction, and also conduct removal of lid member from the outer container in a simple manner.

According to a heat-insulating cooking container in which a stop projecting member is provided facing outward towards the protruding end of the hinge member main body, it is unnecessary to form a projecting sheet in the hinge member, or form a stop-click in the hinge-receiving member. Therefore, it is possible to simplify the container structure and reduce manufacturing costs therein. In addition, when the hinge member is covered (engaged) by the hinge-receiving member, the wall surfaces of the outer portion of the hinge member main body and the stopping wall of the hinge-receiving member are placed adjacent to each other thereby supporting each other. In this manner, a stable stoppage state is generated, and rattling therein can be further reduced.

DETAILED DESCRIPTION OF THE PREFERRED EMBODIMENTS

First Embodiment in the following, a heat-insulating cooking container according to the first embodiment of the present invention will be explained with reference to FIGS. 1–5.

In the aforementioned Figures, an outer container 1, inner container 2, and lid member 3 are provided. In the same manner as in the aforementioned conventional examples, lid member 3 is formed from tipper lid body 3a, lower lid body 3b, and insulating material 3c existing in between the aforementioned.

Figure 1:
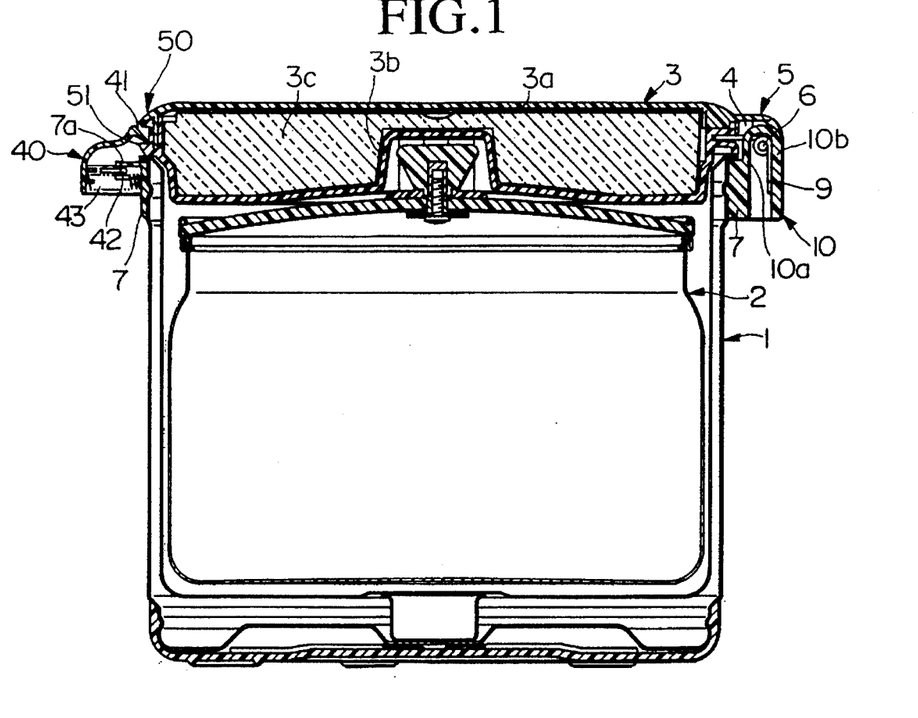
FIG. 1 is a longitudinal cross-sectional diagram showing a heat-insulating cooking container according to a first embodiment of the present invention.

This lid member 3 possesses a depressed structure in which the lower edge of lid member 3 rests at a position below the mouth opening of the outer container 1. The difference between the outer diameter of the lower lid body 3b and the inner diameter of the aforementioned outer container 1 is arranged within a range such that at the time when lid member 3 and outer container 1 are closed, the air existing between the aforementioned does not generate convection; preferably, the aforementioned difference is not greater than 7 mm.

In addition, a convex portion 5 protruding outwards is provided at the peripheral portion of lid member 3 possessing rib walls 4 and 4 on both sides therein. On a peripheral mouth portion of outer container 1, i.e., on the outer surface of shoulder member 7, a hinge portion 10 is provided. This hinge portion 10 comprises container side wall 10a which is integrally formed with shoulder member 7 and wall 10b extending from the upper edge therein and bending downwards. The width of container side wall 10a and wall 10b is formed so as to approximately conform to the dimensions between rib walls 4 and 4 of the aforementioned lid member 3.

At the upper end of hinge portion 10, an aperture is formed thorough which one arm of torsion spring 9 penetrates in a radial direction, which is large enough to allow for return movement therein.

In addition, a hinge axis 6 is arranged horizontally in the aforementioned hinge portion 10: the aforementioned torsion spring 9 is axially maintained by this hinge axis 6, and rib walls 4 and 4 of lid member 3 engage both ends of this hinge axis 6 such that lid member 3 is can be opened and closed. One arm of torsion spring 9 protrudes radially inward, and penetrates through the aforementioned aperture at the upper end of hinge portion 10 to engage lid member 3. In addition, the other arm of torsion spring 9 is arranged along the inner surface of wall 10b of hinge portion 10.

Figure 2:
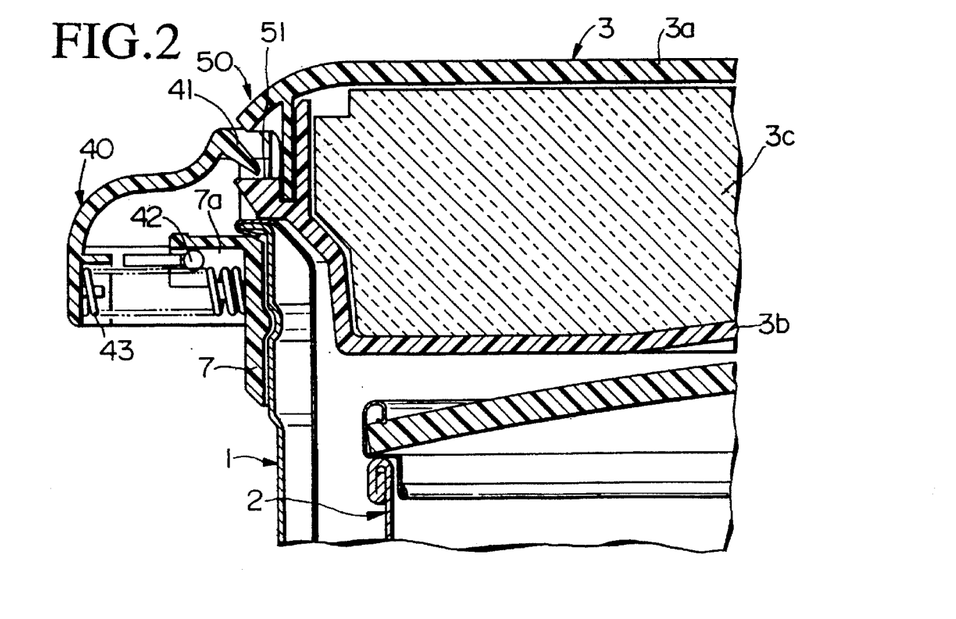
FIG. 2 is an enlarged cross-sectional diagram showing a locking mechanism according to the first embodiment.

Furthermore, a locking mechanism is provided which is formed from hook 40 provided at the periphery of shoulder member 7 on the side opposite the aforementioned hinge portion 10, and hook stopper 50 provided on the peripheral edge of lid member 3 at a position facing the aforementioned hook 40. FIG. 2 is a diagram showing an enlarged view of this locking mechanism. At the upper end of hook 40a, hook click 41 is provided protruding downward at an incline for catching (stopping) in hook stopper 50. This hook 40 is axially maintained in a rotatable manner by means of projection 7a which projects towards the exterior from the outer peripheral face of shoulder member 7 of outer container 1, via hinge axis 42. In addition, coil spring 43 is provided in between the lower end of hook 40 and shoulder member 7 with its end portions fixed respectively thereon. By means of the restoring force of coil spring 43, the aforementioned hook 40 is biased to a stopping position shown in FIG. 1.

In addition, hook stopper 50 provided on the lid member 3 side possesses stopper top panel 51 for stopping the tip of hook click 41.

In the aforementioned locking mechanism, the tip of hook click 41 provided in hook 40 is set so as to stop in the center of stopper top panel 51 of hook stopper 50.

Figure 3:
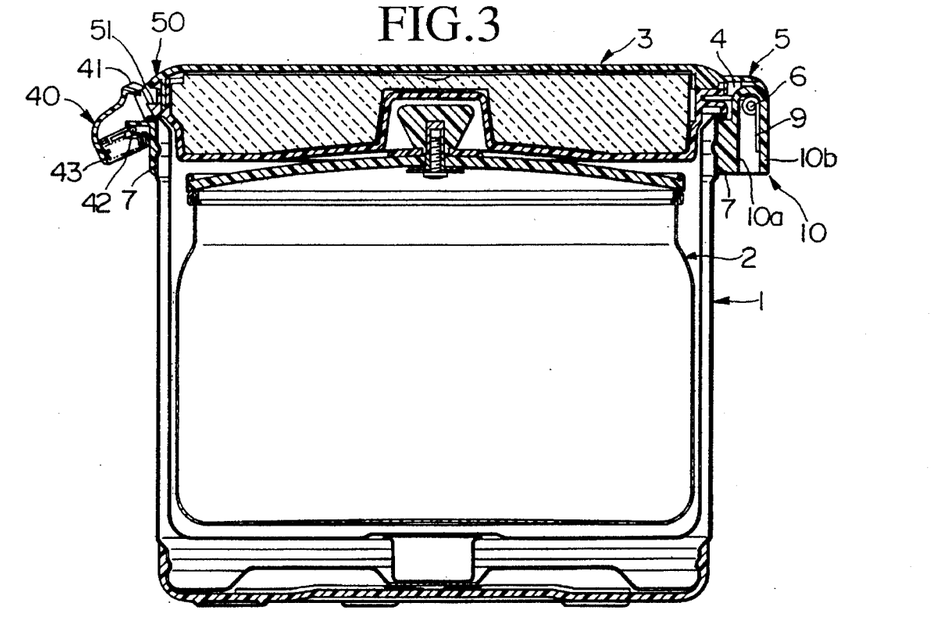
FIG. 3 is a cross-sectional diagram showing a situation in which a hook is rotated using a hinge as the fulcrum according to the first embodiment.
Figure 4:
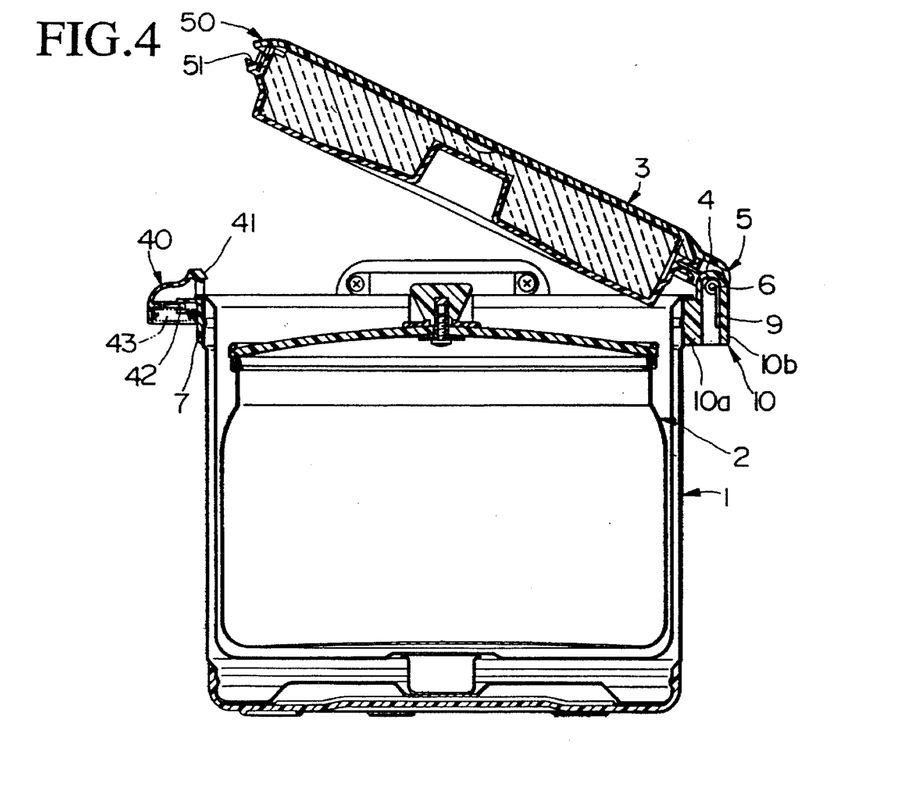
FIG. 4 is a cross-sectional diagram showing a state in which the lid of the aforementioned heat-insulating cooking container is opened according to the first embodiment.

In this heat-insulating cooking container, torsion spring 9 for biasing lid member 3 in the opening direction is provided in hinge portion 10; thus, at the time of opening lid member 3, hook 40 is depressed and rotated in a direction such that the bottom end thereof approaches outer container 1 using hinge 42 as the fulcrum. Subsequently, the lock is released by means of separating hook click 41 from stopper top panel 51 of hook stopper 50, and at the same time, by means of the restoring force of torsion spring 9 arranged in hinge portion 10, the lid member is raised upwards.

Figure 5:
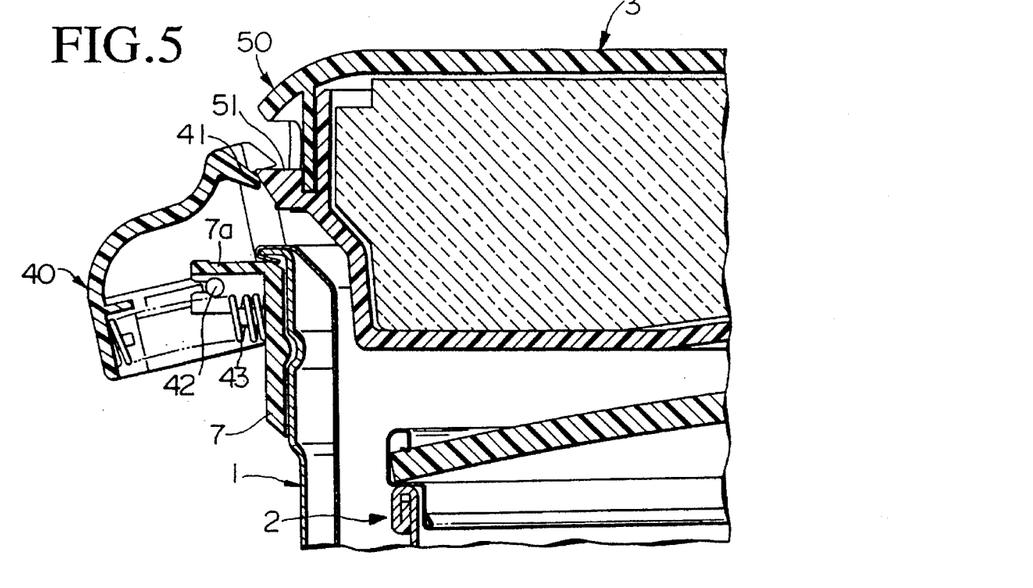
FIG. 5 is a cross-sectional diagram showing a state in which the side surface or a hook stopper provided in a lid member is placed in contact with the upper edge of a hook click according to the first embodiment.

In addition, in order to close and lock lid member 3, lid member 3 is placed over the mouth opening of outer container 1, and the inclined side face of hook stopper 50 of lid member 3 is placed in contact with the upper surface of hook click 41 of hook 40. This lid member 3 is then pressed downward, and hook 40 is rotated while sliding the upper surface of hook click 41 by means of the side surface of hook stopper 50. Lid member 3 is then sealed at the opening end of outer container 1. At this time, hook 40 is returned to the stopping position by means of spring 43, and lid member 3 is locked onto outer container 1 by means of stopping hook click 41 on stopper top panel 51.

In this type of heat-insulating cooking container, it is possible to automatically open lid member 3 by simply rotating hook 40. In addition, it is possible to close and lock the lid by simply placing lid member 3 on top of the mouth opening of outer container 1 and pressing thereon. In this manner, the troublesome operation posed by the opening/closing of the lid can be solved.

Furthermore, in the hinge portion 10 connecting outer container 1 and lid member 3, lid member 3 is biased in the opening direction by means of torsion spring 9; thus, rattling in the connecting portion of lid member 3 and outer container 1 is reduced significantly.

In addition, by means of providing hinge axis 6 at a position above the upper end of outer container 1, it is possible to simplify the manufacturing process, and also allow for smooth opening/closing of lid member 3. In this manner, it is possible to increase the external appearance of the heat-insulating cooking container.

In the aforementioned, according to the heat-insulating cooking container of the present embodiment, a coil spring 43 was employed as the spring for biasing hook 40 into a stopping position; however, it is also possible to use other springs such as a plate spring and/or provide another spring for axially supporting a torsion spring in the axial supporting member of hook 40 and shoulder member 7 of outer container 1.

In addition, according to the aforementioned embodiment, torsion spring 9 is presented as an example of a spring for biasing lid member 3 in the opening direction. However, it is also possible to use, instead, any spring possessing a similar function, such as a plate spring or the like.

The diameter of stopper top panel 51 of hook stopper 50 is preferably set to at least 3 mm in a manner such that hook 40 can be stopped even in the case when the mouth opening of outer container 1 is eccentric or deformed.

Furthermore, with regard to stopper top panel 51 formed on the lid member 3 side, it is also possible to form uneven surfaces possessing a wavy or dotted surface thereof in order to facilitate the stopping of hook click 41.

Second Embodiment

In the following, a heat-insulating cooking container according to the second embodiment of the present invention will be explained with reference to FIGS. 6~10. Structural components similar to those described above in the first embodiment will be denoted by the same numerals and explanations thereof will be omitted.

Figure 6:
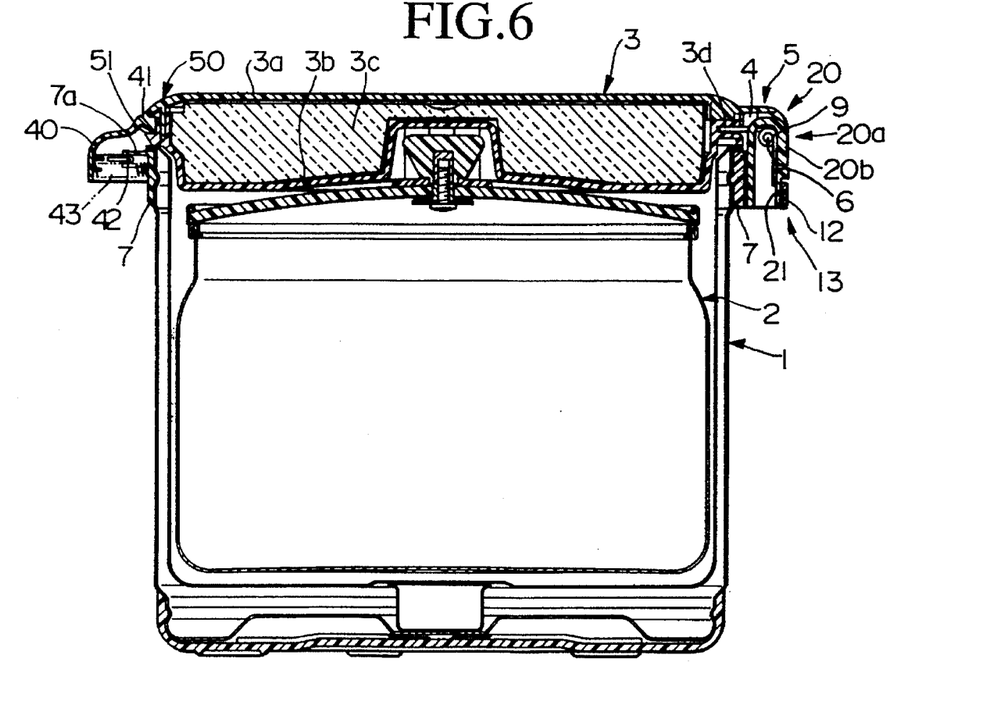
FIG. 6 is a longitudinal cross-sectional diagram showing a heat-insulating cooking container according to a second embodiment of the present invention.

On the outer peripheral portion of lid member 3 of this heat-insulating cooking container, convex portion 5 protruding toward the exterior is provided possessing rib walls 4 and 4 on both sides thereof. Hinge axis 6 extends horizontally between these rib walls 4 and 4. In addition, hinge portion main body 20a is installed in this hinge axis 6 in a rotatable manner. This hinge portion main body 20a forms an inverse U-shape when viewed in a cross-sectional manner, and is sandwiched between the aforementioned two rib walls 4 and 4 without the provision of space therein.

Torsion spring 9 is axially maintained by means of hinge axis 6 with one arm protruding radially inwards therefrom; hinge portion 20 is formed from the aforementioned hinge axis 6, hinge portion main body 20a, and torsion spring 9.

Figures 7, 8, 11:
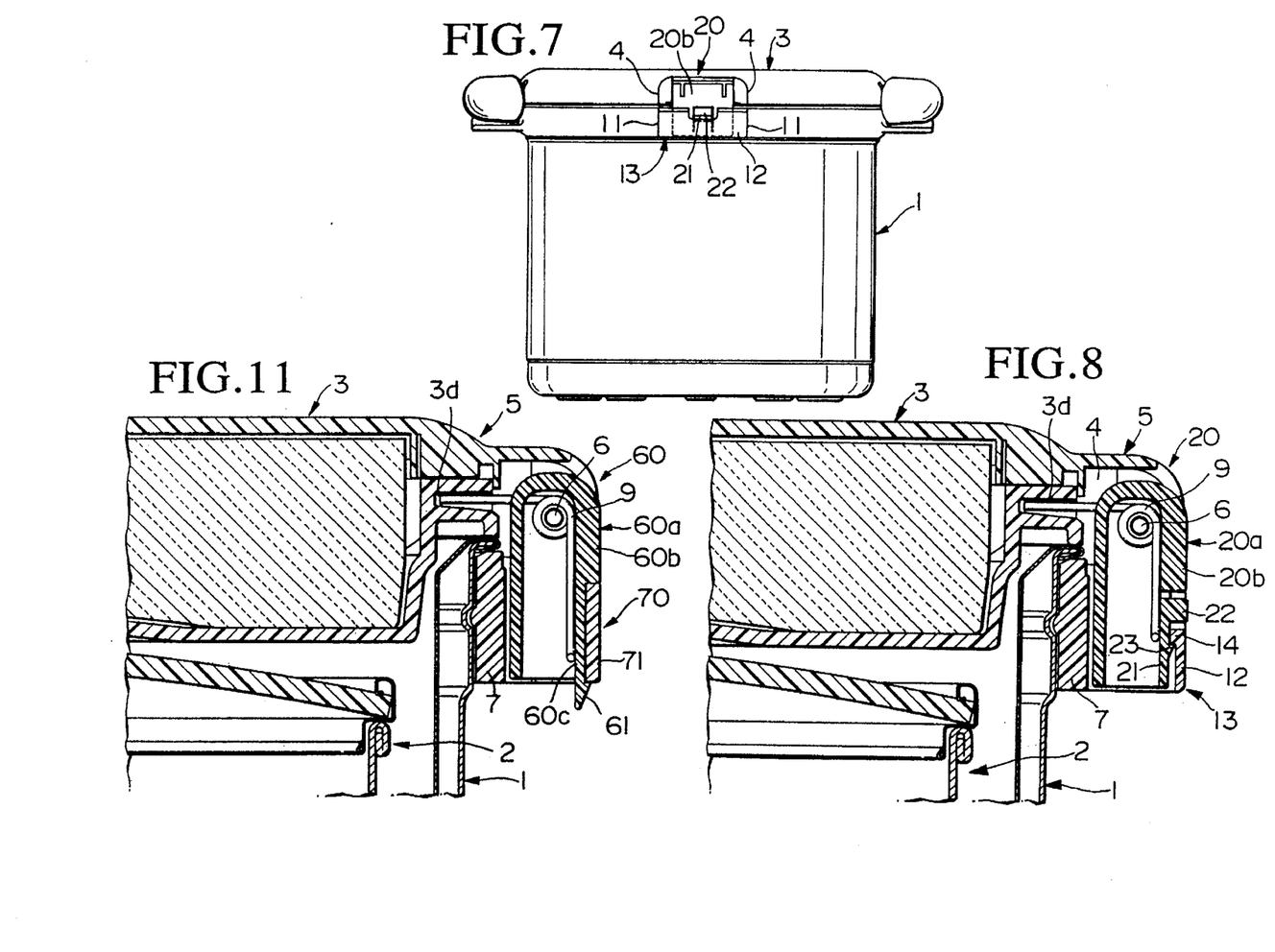
FIG. 7 shows a view from the right-hand side of the container shown in FIG. 6.
FIG. 8 is a partial cross-sectional diagram showing a state in which the lid member is closed according to the second embodiment.
FIG. 11 is a partial cross-sectional diagram showing a third embodiment of the present invention.

Torsion spring 9 is axially maintained at the axial support of lid member 3 and hinge portion main body 20a. One arm of this torsion spring 9 penetrates through an aperture at the upper part of hinge portion main body 20a and is inserted into torsion spring engaging aperture 3d of lid member 3. The other arm of this torsion spring 9 is arranged facing downward in the interior of hinge portion main body 20a. Lid member 3 is biased in the opening direction by means of this torsion spring 9. By inserting in a notch into the wall surface of exterior side portion 20b of hinge portion main body 20a, only the bottom end therein forms a tongue-shaped projecting sheet 21 which is integrated with the aforementioned outer side portion 20b. It is possible to bend this projecting sheet 21 towards the interior of the container by means of applying pressure thereon. A push-button 22 is provided on the upper wall surface of this projecting sheet 21 for applying pressure (pushing) thereon. In addition, on the exterior wall surface of the aforementioned projecting sheet 21, a stop projecting member 23 is formed below the aforementioned push-button 22 which gradually expands in the upward direction.

On the peripheral mouth portion of the aforementioned outer container 1, a circular shoulder member 7 is installed in a forcibly engaging manner.

At one end of this shoulder member 7, a box-shaped hinge-receiving member 13 is provided opening in the upward/downward directions which is formed from side walls 11 and 11, and stop wall 12 which lies facing the aforementioned shoulder member 7. This hinge-receiving member 13 is attached in a manner for engaging hinge portion main body 20a provided on lid member 3.

The upper part of stop wall 12 is cut out to form a U-shape as shown in FIG. 7, such that at the time when the aforementioned hinge portion main body 20a is engaged by hinge-receiving member 13, push-button 22 formed in projecting sheet 21 is outwardly displaced. Furthermore, a stop-click 14 extending towards the container is formed in the upper part of stop wall 12. In the case when hinge portion main body 20a is engaged by (i.e., is received by) hinge-receiving member 13, stop projecting member 23 of projecting sheet 21 is designed to be stopped by means of this stop clip.

Furthermore, as described in the aforementioned first embodiment, hook 40 is provided in shoulder member 7 on the side opposite hinge-receiving member 13; and a hook stopper 50, similar to that described in the first embodiment, is arranged at the periphery of lid member 3 facing this aforementioned hook 40.

Similarly, in the second embodiment, a torsion spring 9 is used as an example of a spring for biasing lid member 3 in the opening direction; however, it is also possible to use any spring possessing similar function instead, such as a plate spring or the like.

Figure 9:
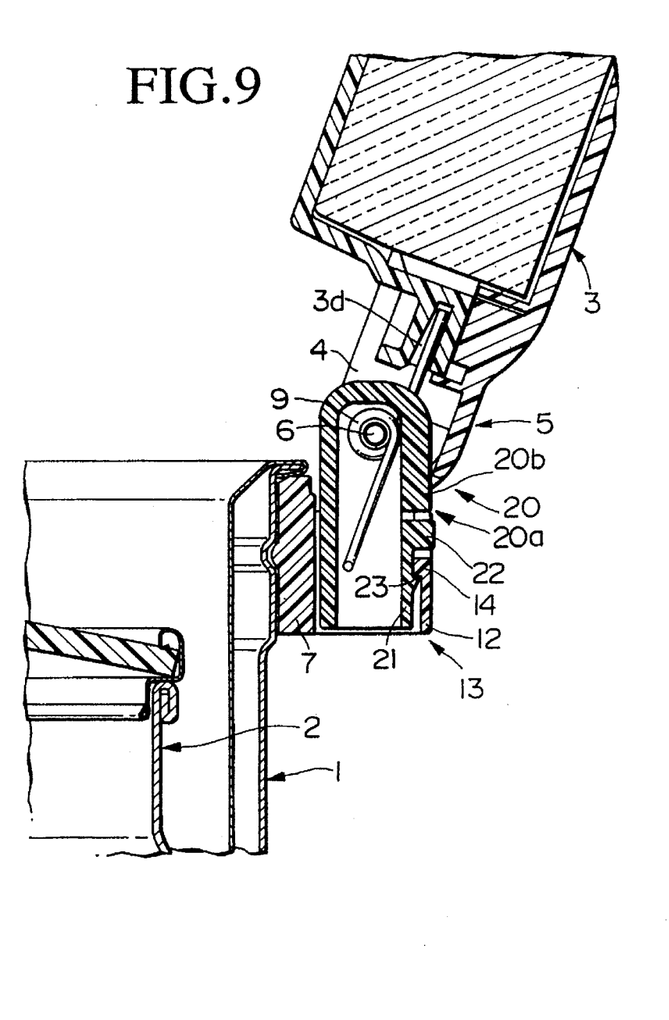
FIG. 9 is a partial cross-sectional diagram showing a state in which the lid member is opened according to the second embodiment.

In order to replace lid member 3 of heat-insulating cooking container possessing the aforementioned structure onto outer container 1, hinge portion main body 20a is inserted from above hinge-receiving member 13 in a manner such that stop wall 12 of hinge-receiving member 13 and projecting sheet 21 of hinge portion 20 come to face opposite each other. The expanded flank of stop projecting member 23 formed in the upper part of projecting sheet 21 comes in contact with stop-click 14 formed in the upper part of stop wall 12 and is pressed toward the container in accordance with the sliding of the container side wall surface of this stop-click 14. In this manner, projecting sheet 21 is forcibly bent towards the interior of the container. Furthermore, projecting sheet 21 is displaced downward in a forcibly bent state, and when stop projecting member 23 clears stop-click 14, projecting sheet 21 is restored to its original position, as shown in FIG. 9 by means of the intrinsic elastic force of projecting sheet 21 itself. At this time, any further downward displacement of hinge portion main body 28 within hinge-receiving member 13 is prevented by means of push-button 22 or the stopper projecting from the wall surface of hinge portion main body 20a coming in contact with hinge-receiving member 13.

The opening/closing operation of lid member 3 is identical to the opening/closing operation described in the aforementioned first embodiment.

Figure 10:
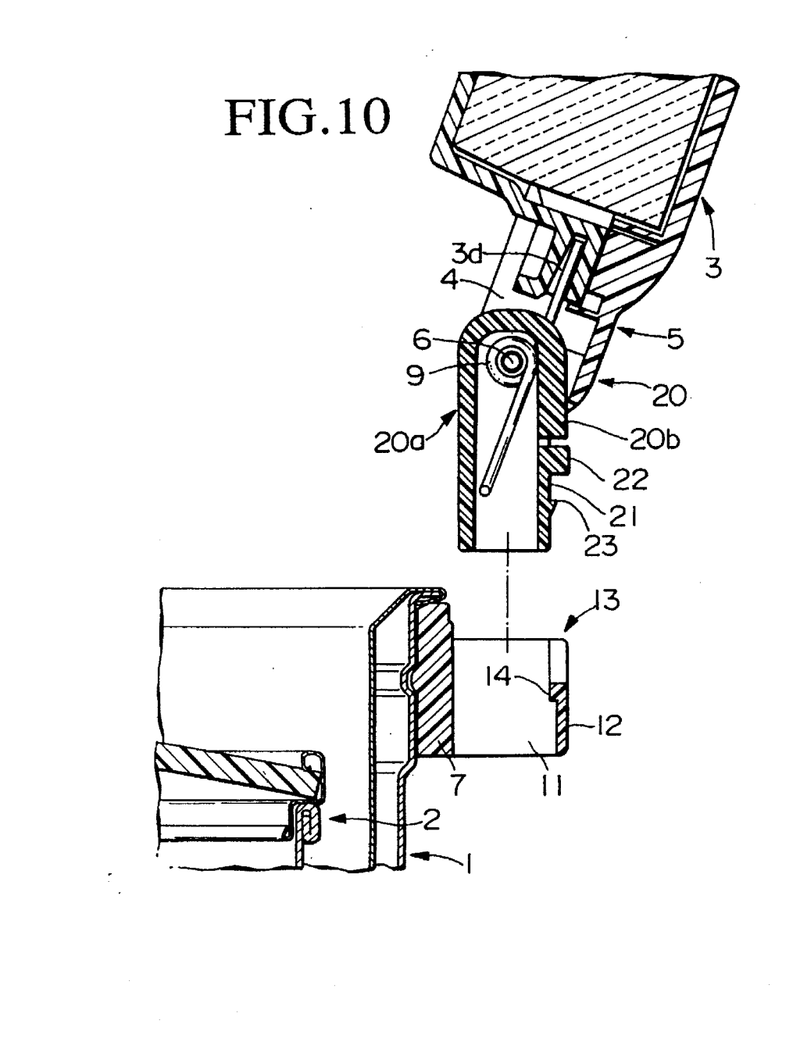
FIG. 10 is a partial cross-sectional diagram showing a state in which the lid member is removed from the outer container according to the second embodiment.

In order to remove lid member 3 from outer container 1, push button 22 provided in projecting sheet 21 of hinge portion 20 is forcibly bent towards the container interior after opening lid member 3, and lid member 3 and hinge portion 20 are lifted upwards with stop projecting member 23 in a state clear of stop-click 14. In the aforementioned heat-insulating cooking container, it is possible to conduct replacement/removal of lid member 3 by means of forcibly bending projecting sheet 21 and releasing the stoppage of stop projecting member 23 and stop-click 14 of hinge-receiving member 13. As a result, for example, it is possible to easily wash the container in a state in which lid member 3 is removed from outer container 1.

Furthermore, when lid member 3 is closed, lid member 3 is biased in the opening direction by means of torsion spring 9 provided at the axial support of lid member 3 and hinge portion main body 20a and at the same time, the other end of torsion spring 9 comes in contact with the container side wall surface of projecting sheet 21, thereby pushing this projecting sheet 21 in the outward direction. As a result, it is possible to further increase the reliability of stoppage between stop projecting member 23 and stop-click 14.

Furthermore, when lid member 3 is in an open state, the exterior depression force on projecting sheet 21 is released due to the extended state or torsion spring 9. Therefore, it is possible to easily bend projecting sheet 21 towards the container interior and the removal operation can be conducted without hindrance.

Third Embodiment

In the following, a heat-insulating cooking container according to the third embodiment of the present invention will be explained with reference to FIG. 11. Structural components similar to those described above in the first and second embodiments will be denoted by the same numerals and explanations thereof will be omitted.

The hinge portion 60 according to the third embodiment possesses a structure comprising tube 60c provided with stop projecting member 61 extending downward with its projecting end thereof extending toward the exterior and possessing a reduced thickness from approximately the center of adder portion 60b of hinge portion main body 60a. This aforementioned stop projecting member 61 is stopped by the lower end of stop wall 71 of hinge-receiving member 70 in a state in which tip 60c is inserted into hinge-receiving member 70 of shoulder member 7. Stop projecting member 61 possesses a flank gradually expanding outwards in the upward direction. In addition, when hinge portion 60 is removed from hinge-receiving member 70, in order to depress stop projecting member 61 towards the container and forcibly bend tip 60c toward the lower end of stop wall 71 of stop projecting member 61 to release the stoppage state, it is preferable for the dimensions of the aforementioned flank of stop projecting member 61 to be designed such that this flank can be easily depressed by means of a finger. In addition, it is not necessary to form stop projecting member 61 extending over the entire lower end of outer portion 60b of hinge portion main body 68, as a stop projecting member 61 may be formed in the center of the lower end of outer portion 60b, or similar stop projecting members may be provided at each end thereof.

The length of stop wall 71 of hinge-receiving member 70 in the orthogonal direction is set equal to the thin wall length of tip 60c of hinge portion 60.

As described in the aforementioned second embodiment, lid member 3 and hinge portion main body 60a are axially maintained in a rotatable manner by means of hinge axis 6. Torsion spring 9 is axially maintained by means of hinge axis 6 with one arm thereof penetrating through an aperture at the upper part of hinge portion main body 60a and inserting into torsion spring engaging aperture 3d of lid member 3. In addition, the other arm of this torsion spring 9 is arranged facing downward in the interior of hinge portion main body 60a. In this manner, lid member 3 is biased in the opening direction by means of the above-described torsion spring 9.

Furthermore, in the third embodiment, it is also possible to employ a plate spring in place of the above torsion spring 9 as a spring for biasing lid member 3 in the opening direction.

In order to replace lid member 3 onto outer container 1 in the above-described heat-insulating cooking container, hinge portion main body 60a of lid member 3 is inserted from above into hinge-receiving member 70 provided in shoulder member 7 of outer container 1. Stop projecting member 61 which is formed at the lower end of outer portion 60b of hinge portion main body 60a possesses a flank which expands gradually towards the exterior in the upward direction. Thus, by sliding the upper end and container side wall surface of stop wall 71 of hinge-receiving member 70, the aforementioned stop projecting member 61 is depressed toward the container, and tip 60c is forcibly bent toward the container interior.

With tip 60c in the forcibly-bent state described above (i.e., forcibly bent towards the container side), hinge portion main body 60a is pushed further downward, and the aforementioned stop projecting member 61 clears the bottom end of stop wall 71. At the same time, tip 60c is restored to its original shape by means of the intrinsic elasticity therein and stop projecting member 61 is stopped by means of the bottom end of stop wall 71.

Subsequently, the expanded lower end of outer portion 60b of hinge portion main body 60a comes in contact with the upper end of stop wall 71, thereby preventing any further engagement of hinge portion main body 60a and hinge-receiving member 70.

In order to remove lid member 3 from outer container 1, stop projecting member 61 which is stopped at the lower end of stop wall 71 is pushed towards the container, thereby forcibly bending tip 60c in the same direction. In this manner, the stoppage (locking) of stop projecting member 61 with stop wall 71 is released, and lid member 3 and hinge portion 60 can then be lifted upwards.

According to the heat-insulating cooking container of the present third embodiment, the manufacture of the container can be simplified since a more simplified structure is realized when compared with the hinge portion 20 of the above-described second embodiment.

In addition, when engaging hinge portion 60 and hinge-receiving member 70, it is possible to increase the contact surface area between the outer portion 60b of hinge portion main body 60a and stop wall 71 of hinge-receiving member 70. Therefore, according to the present embodiment, it is possible to achieve an excellent stoppage (locked) state and also reduce rattling therein.

Fourth Embodiment

Figure 12:
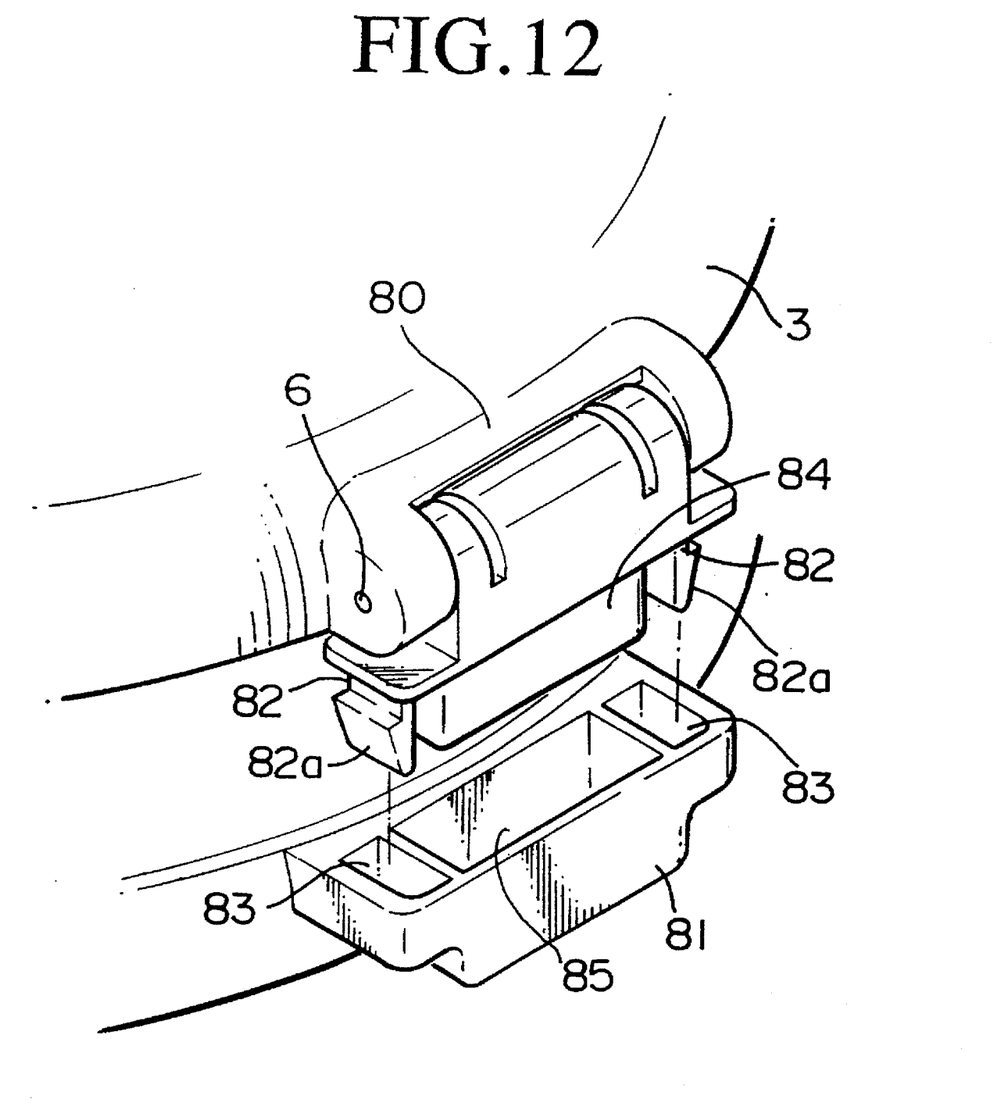
FIG. 12 is an inclined view showing a fourth embodiment of the present invention.

In the following, the fourth embodiment of the present invention will be explained with reference to FIG. 12. The heat-insulating cooking container according to the present invention comprises approximately the same structural components as the heat-insulating cooking containers described in the aforementioned second and third embodiments. Hence, in the present embodiment, the case in which the replacement/removal structure of lid member 3 with respect to outer container 1 is modified will be described. According to the present embodiment, a box portion 84 housing an end of the torsion spring, and projecting sheets 82 and 82 provided respectively on each side of box portion 84 in which stop-clicks 82a and 82a are provided on the lower end thereof, are provided in hinge portion main body 80 which is formed in lid member 3. In addition, a passage 85 into which the aforementioned box portion of hinge portion main body 80 is inserted, and passages 83 and 83 into which the above-described two projecting sheets 82 and 82 are inserted, are provided in hinge-receiving member 81 which is formed in the shoulder member of outer container 1.

in the case when hinge portion main body 80 is engaged into hinge-receiving member 81, projecting sheets 82 and 82 are inserted into passages 83 and 83 of hinge-receiving member 81 while holding both the aforementioned projecting sheets 82 and 82 of hinge portion main body 80 and pushing them towards each other (i.e., pinching). Together with this, box portion 84 of hinge portion main body 80 is inserted into passage 85. When box portion 84 and projecting sheets 82 and 82 are inserted up to a predetermined position in hinge-receiving member 81, stop-clicks 82a and 82a of projecting sheets 82 and 82 are cleared from passages 83 and 83, and the forced bending (i.e., pinching) of both projecting sheets 82 and 82 is released. In this manner, both projecting sheets 82 and 82 are slightly expanded, and each stop-click 82a and 82a thereof is engaged into the lower opening end of their respective passage 83 and 83. As a result, hinge portion main body 80 is maintained in a stable state in hinge-receiving member 81.

On the other hand, when removing hinge portion main body 80 engaged to hinge-receiving member 81, stop-clicks 82a and 82a engaging into the lower opening end of passages 83 and 83 of hinge-receiving member 81 are pressed using the finger and the respective engagements are released, thereby allowing for the lid member 3 to be raised upwards.

According to the heat-insulating cooking container of the present embodiment, in addition to the same result obtained in the above-described second and third embodiments, the replacement/removal structure of lid member 3 with respect to outer container 1 is simplified, thereby decreasing the manufacturing costs of the resulting container.

However, the disclosures of the above-described embodiments of the present invention are not restricted to the aforementioned examples, as various modifications are possible. For example, in each of the aforementioned embodiments, a vacuum heat insulating layer was formed in between the inner bottle and outer bottle of the outer container; however, it is also possible to employ an outer container possessing a heat insulating layer which has been filled with a powdery heat insulating material such as perlite and/or a heat insulating foam such as styrene foam, urethane foam, or the like in between the outer bottle and inner bottle.

What is claimed is:

1. A heat-insulating cooking container comprising:
    an outer container possessing heat-insulating properties;
    an inner container replaceably housed in said outer container;
    a lid member, which can be opened and closed, possessing heat-insulating properties, the lid member provided at a peripheral mouth portion of said outer container;
    a connecting member connecting said outer container and said lid member, said connecting member equipped with a hinge axis axially supporting said lid member such that said lid member can be opened and closed with respect to said outer container, and a biasing member for biasing said lid member in an opening direction; and
    a stopping member for maintaining a state in which said lid member is closed.

2. A heat-insulating cooking container according to claim 1, wherein said outer container is a vacuum insulating container.

3. A heat-insulating cooking container according to claim 1, wherein said outer container is an insulating container filled with a heat-insulating material.

4. A heat-insulating cooking container according to claim 1, further comprising:
    a hook provided on a peripheral mouth portion of said outer container opposite said connecting member; and
    a hook stopping member provided at a peripheral position facing said hook of said lid member;
wherein, said hook is axially maintained in a vertically rotatable manner at a peripheral mouth portion of said outer container, and is biased towards a position for locking said lid member.

5. A heat-insulating cooking container according to claim 4, wherein an engaging member of at least 3 mm is provided in said hook stopping member.

6. A heat-insulating cooking container according to claim 1, wherein said biasing member of said connecting member is one of a coil spring, a torsion spring, and a leaf spring.

7. A heat-insulating cooking container according to claim 6, wherein said biasing member is a torsion spring which is axially maintained by means of said hinge axis which is provided in a hinge member, in a state in which said lid member is biased in an opening direction wherein one arm of said torsion spring is inserted into said lid member and another arm of said torsion spring is arranged facing downward in an interior of said hinge member.

8. A heat-insulating cooking container according to claim 1, wherein said hinge axis is provided at a position above an upper end of said outer container.

9. A heat-insulating cooking container comprising:

an outer container possessing heat-insulating properties;

an inner container replaceably housed in said outer container;

a lid member, which can be opened and closed, possessing heat-insulating properties provided at a peripheral mouth portion of said outer container;

a ring-shaped shoulder member provided at a peripheral mouth portion of said outer container and comprising a hinge member equipped with a hinge axis and a biasing member which is provided with one end thereof projecting radially inward; and a hook stopping member;

wherein said hook stopping member engages said lid member with said hinge axis of said hinge member, engages said lid member in a state in which said lid member is biased in an opening direction by means of one end of said biasing member, and engages a hook at a peripheral position facing said hook of said lid member.

10. A heat-insulating cooking container according to claim 9, wherein said outer container is a vacuum insulating container.

11. A heat-insulating cooking container according to claim 9, wherein said outer container is an insulating container filled with a heat-insulating material.

12. A heat-insulating cooking container according to claim 9, wherein said hook is axially maintained in a vertically rotatable manner at a peripheral mouth portion of said outer container and is biased towards a position for locking said lid member in a closed state.

13. A heat-insulating cooking container according to claim 12, wherein an engaging member of at least 3 mm is provided in said hook stopping member.

14. A heat-insulating cooking container according to claim 9, wherein said biasing member of said connecting member is one of a coil spring, a torsion spring, and a leaf spring.

15. A heat-insulating cooking container according to claim 14, wherein said biasing member is a torsion spring which is axially maintained by means of said hinge axis which is provided in a hinge member, in a state in which said lid member is biased in an opening direction wherein one arm of said torsion spring is inserted into said lid member and another arm of said torsion spring is arranged facing downward in an interior of said hinge member.

16. A heat-insulating cooking container according to claim 9, wherein said hinge axis is provided at a position above an upper end of said outer container.

17. A heat-insulating cooking container comprising:

an outer container possessing heat-insulating properties;

an inner container replaceably housed in said outer container;

a lid member, which can be opened and closed, possessing heat-insulating properties, and provided at a peripheral mouth portion of said outer container;

a hinge member comprising a hinge axis, a hinge member main body provided in a rotatable manner in said hinge axis, and a biasing member provided with one end thereof projecting radially inward, said hinge member provided at the periphery of said lid member in a state in which said lid member is biased in an opening direction by means of one end of said biasing member, said hinge member comprising a hinge axis:

a hook stopping member provided at a peripheral side of said lid member opposite said hinge member; and a ring-shaped shoulder member provided at a peripheral mouth portion of said outer container and comprising a hinge-receiving member into which said hinge member of said lid member can be removably installed, and a hook provided at a peripheral side of said lid member opposite said hinge-receiving member.

18. A heat-insulating cooking container according to claim 17, wherein said outer container is a vacuum insulating container.

19. A heat-insulating cooking container according to claim 17, wherein said outer container is an insulating container filled with a heat-insulating material.

20. A heat-insulating cooking container according to claim 17, wherein said hook is axially maintained in a vertically rotatable manner at a peripheral mouth portion of said outer container, and is biased towards a position for locking said lid member in a closed state.

21. A heat-insulating cooking container according to claim 20, wherein an engaging member of at least 3 mm is provided in said hook stopping member.

22. A heat-insulating cooking container according to claim 17, wherein said biasing member of said connecting member is one of a coil spring, a torsion spring, and a leaf spring.

23. A heat-insulating cooking container according to claim 22 wherein said biasing member is a torsion spring which is axially maintained by means of said hinge axis which is provided in a hinge member, in a state in which said lid member is biased in an opening direction wherein one arm of said torsion spring is inserted into said lid member and another arm of said torsion spring is arranged facing downward in an interior of said hinge member.

24. A heat-insulating cooking container according to claim 17, further comprising:

a stop-click provided in said hinge-receiving member;

a projecting sheet member provided in said hinge member which can be forcibly bent in a radially inward direction and restored to an opposite side therein; and a stop projecting member provided in said projecting sheet member for engaging said stop-click.

25. A heat-insulating cooking container according to claim 24, wherein another end of said biasing member arranged in said hinge member is in contact with an interior wall surface of said projecting sheet member.

26. A heat-insulating cooking container according to claim 24, wherein said stop projecting member is formed in a protruding end of said hinge member main body for engaging a lower end of said hinge-receiving member.

27. A heat-insulating cooking container according to claim 17, wherein said hinge axis is provided at a position above an upper end of said outer container.

* * * * *